LEAST COST CONSUMPTION AND PRODUCTION COMPUTER

Filed July 26, 1961 4 Sheets-Sheet 1

May 21, 1963 R. LEVI 3,090,557

LEAST COST CONSUMPTION AND PRODUCTION COMPUTER

Filed July 26, 1961 4 Sheets-Sheet 4

United States Patent Office 3,090,557
Patented May 21, 1963

3,090,557

LEAST COST CONSUMPTION AND PRODUCTION COMPUTER

Robert Levi, 21 Rue d'Amsterdam, Paris, France

Filed July 26, 1961, Ser. No. 127,040
4 Claims. (Cl. 235—185)

This invention relates to analog computers.

Certain mathematical problems are encountered which may be expressed algebraically with equations wherein the condition that linear functions of unknowns therein, or these unknowns themselves, are either zero or positive, but never negative.

Such is the case when it is desired to make a choice of the centers of production to supply articles which are all equivalent to various centers of consumption, and to determine the distribution of these articles between the centers of consumption, the entire distribution being such that the cost of transportation is as low as possible.

The present invention relates more particularly to analog computers designed to solve the following problem: Determination of a number $(m \times n)$ of unknown quantities, indicated by the symbols $x_q^p$, wherein the integer $p$ varies from 1 to $m$ and the integer $q$ varies from 1 to $n$, said unknown quantities being either positive or zero, in such a way as to satisfy simultaneously a system of $n$ linear equations:

$$C_q = x_q^1 + x_q^2 + \ldots + x_q^p + \ldots + x_p^m \qquad (Sq)$$

in which the $n$ terms $c_q$ are positive parameters; a system of $m$ linear or equations or inequalities:

$$d^p \geqslant x_1^p + x_2^p + \ldots + x_q^p + \ldots x_n^p \qquad (S^p)$$

where the $n$ terms $d^p$ are positive parameters, and the condition to reduce to a minimum the double sum $$S_q^p = (a_1^1 x_1^1 + a_1^2 x_1^2 + \ldots + a_1^p x_1^p + \ldots a_1^m x_1^m) + \ldots \ldots + (a_q^1 x_q^1 + a_q^2 x_q^2 + \ldots + a_q^p x_q^p + \ldots + a_q^m x_q^m) + \ldots \ldots + (a_n^1 x_n^1 + a_n^2 x_n^2 + \ldots a_n^p x_n^p + \ldots + a_n^m x_n^m)$$

where the $(m \times n)$ coefficients $a_q^p$ of the unknown quantities $x_q^p$ are positive or zero parameters.

Such equations occur in distribution problems of the above noted type wherein it is desired to select production centers which are to deliver identical objects to various consumption centers with a view toward reducing to a minimum the transportation costs between the production centers and consumption centers.

The present invention has as an object the provision of a solution to the above type of problem by transposing into the field of electricity methods heretofore applied by geometric and mechanical means.

This objective is achieved according to the invention by replacing, with electrical quantities, the magnitudes of the forces which in the known mechanical system were, for example, produced by contact between bars or between the bars and associated stop members and, on the other hand, the distances existing between parts capable of coming into contact, the said magnitudes being obtained, according to the invention, by a double electric circuit comprising rectifiers of the semi-conductor type which are intended to make use of the fact that none of them can be "negative." For example, the first of these quantities may be current intensities, and the second may be differences of electrical potential.

The part of the circuit which relates to the first quantities insures, as will be shown, the compatibility of the results with the original numerical data. For example, at the end of the operation, the total of the quantities $q_k^J$ which should be sent from any particular center of production J to any center of consumption $k$ is equal to the quantity $c_k$ required at the said center $k$. Further, the total of the magnitudes representing the quantities to be dispatched from any particular center of production J is at most equal to the quantity $p^J$ available at this center J.

The part of the circuit which is concerned with the second quantities fulfills the condition that the product of $q_k^J$ and $T_k^J$ is a minimum, $T_k^J$ being the unit cost of transportation from a center J to a center $k$. This part of the circuit automatically selects the relations which should exist between the centers of production J and centers of consumption $k$ for quantities $q_k^J$ which are not zero, in order that the result may be a minimum.

The invention will next be explained in greater detail by reference to the accompanying drawing given by way of illustration and not limitation and wherein.

Figure 1:
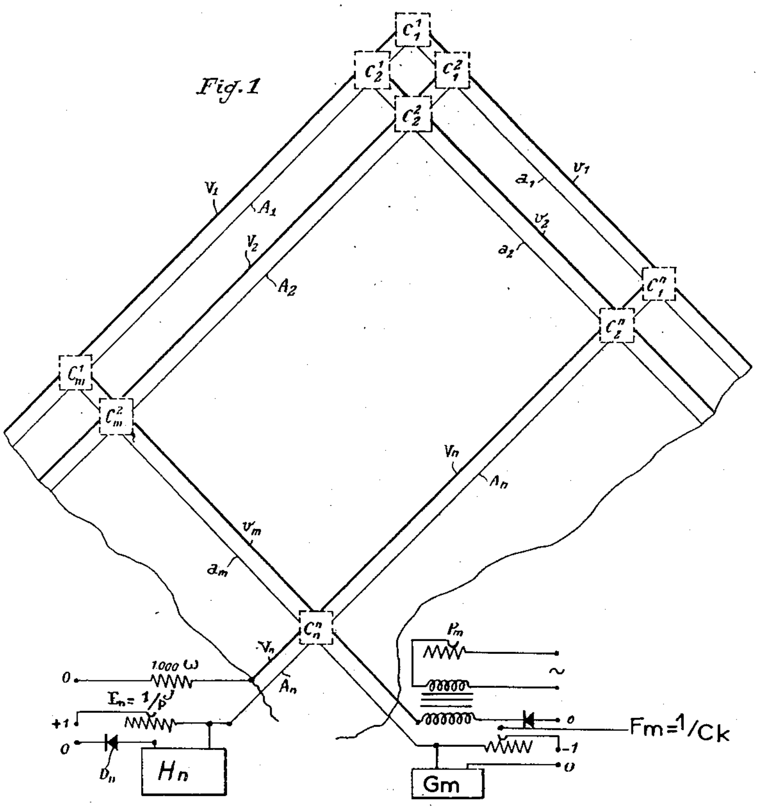
FIGURE 1 is a schematic diagram, in part, of a matrix arrangement of current and potential or voltage bars of production and consumption centers, in accordance with a specific embodiment of the invention.
Figures 2, 3:
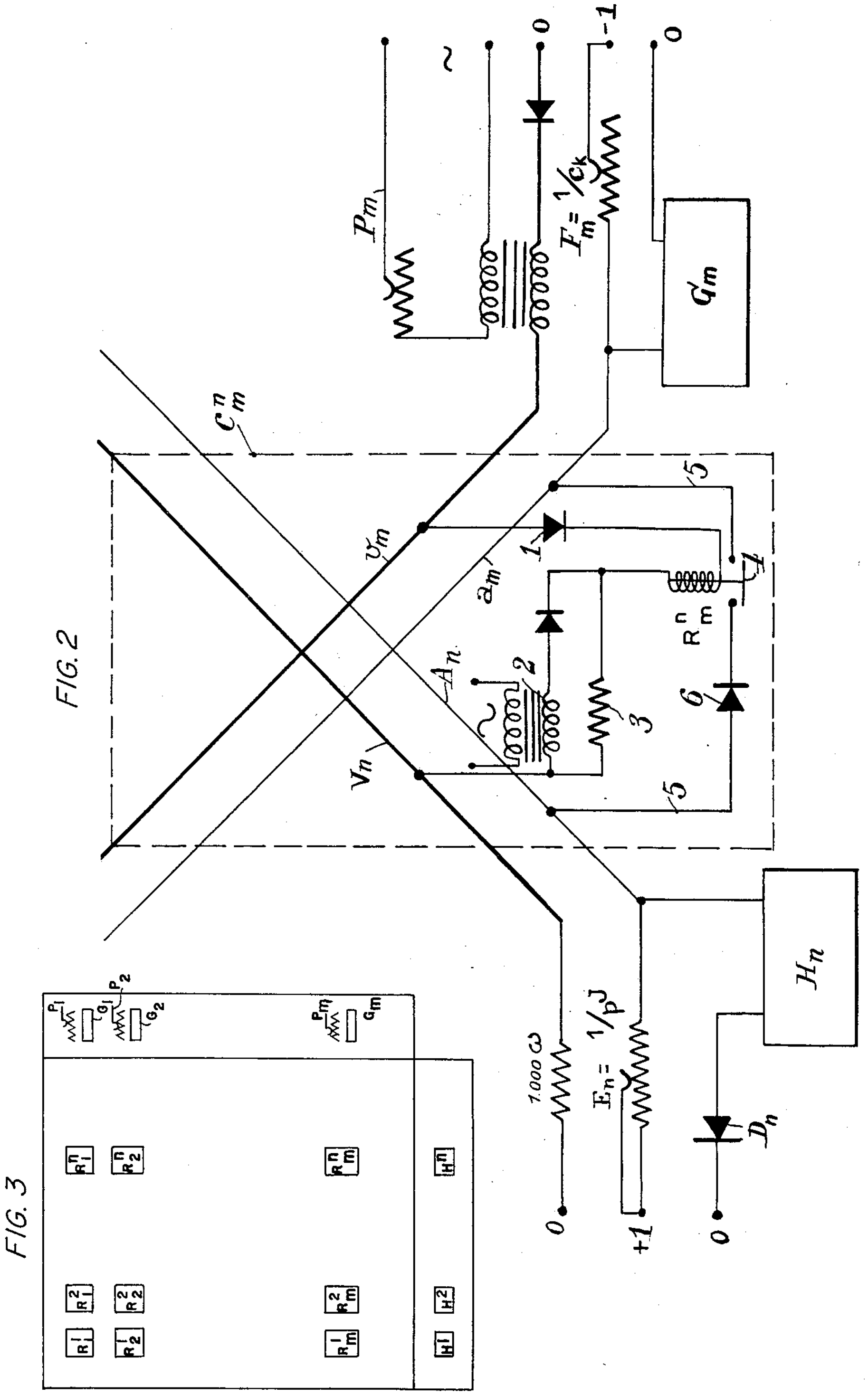
FIGURE 2 is a schematic diagram illustrating the connections between and the elements connected to the current and potential bars of a unit or cell of FIG. 1.
Figure 4:
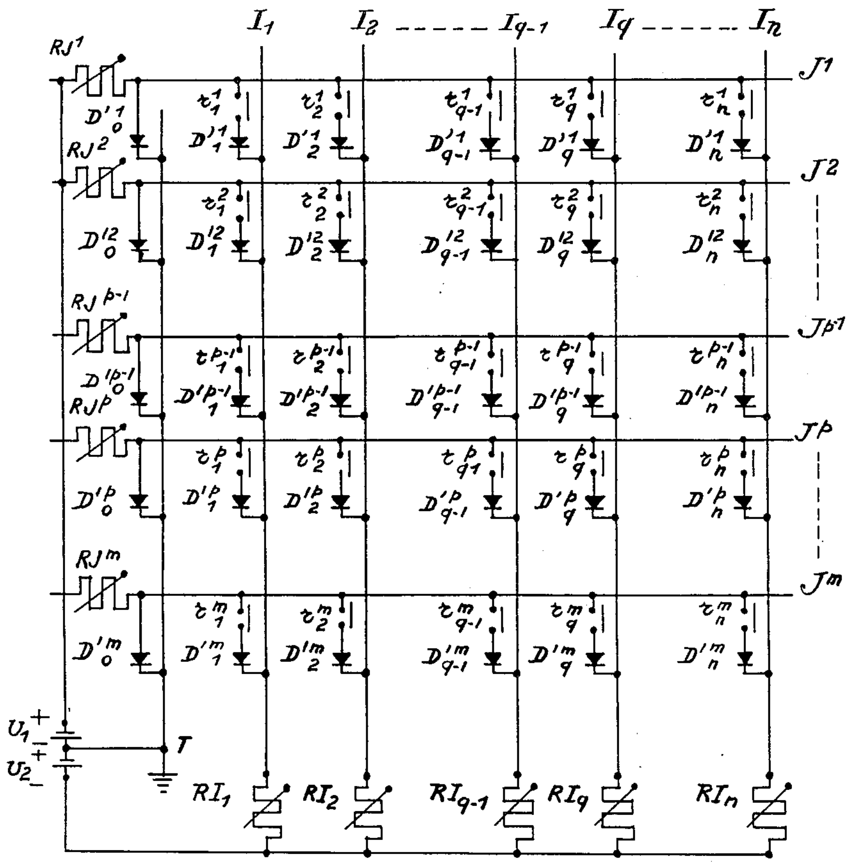
Figure 5:
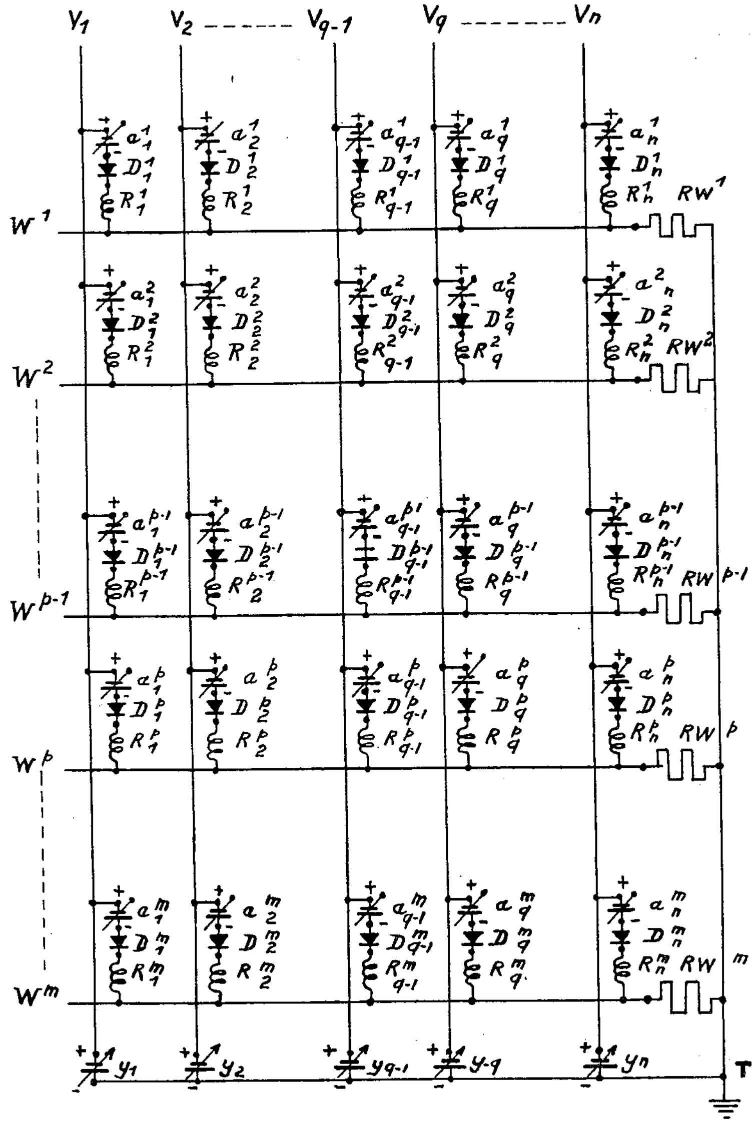

FIGURE 3 diagrammatically illustrates calculating table, or control board, wherefrom control is exercised on the circuits of FIGS. 1 and 2;

FIGURE 4 shows diagrammatically an arrangement of current bars according to the general solution of the invention and including some particulars relating to FIGS. 1–3; and FIGURE 5 shows diagrammatically an arrangement of voltage bars corresponding to FIG. 4.

In the embodiment illustrated in FIGS. 1–3, there are employed to correspond to each center of index J (production), two conducting bars, one known as the "potential bar" and being given references $V_1$–$V_2$ . . . $V_n$, the other being termed the "current bar" with references $A_1$–$A_2$ . . . $A_n$. In the same way, there will correspond to each bar of index $k$ (consumption) two conducting bars, one known as the "potential bar" having references $v_1$–$v_2$ . . . $v_m$, and the other known as the "current bar" with references $a_1$–$a_2$ . . . $a_m$. The electrical resistances of all these conducting bars are negligible.

For the sake of simplicity, these four groups of bars will be designated in the following text as potential bars J, current bars J, and potential bars $k$, current bars $k$.

The current bars J are all supplied at the same positive potential which may be constant or variable with time, and which in the following description will be taken as the unit of potential. Current bars J are supplied via resistance boxes or potentiometers $E_n$ (FIG. 2), which have a conductance which, for each bar J, will measure the quantity $p^J$ available at the center of production J. Current bars J are in communication with zero potential through a corresponding semi-conductor metal rectifier $D_n$ which prevents their actual potential from becoming posiitve, and also through an ammeter $H_n$.

The current bars $k$ are all supplied with a potential −1, which is equal to but of opposite sign with respect to the potential supplied to the current bars J. Current bars $k$ are supplied through the intermediary of resistance boxes or potentiometer $F_m$ which have a conductance which, for each bar $k$, will measure the quantity $c_k$ required at the associated center of consumption $k$. Each of the terminals of these resistance boxes which are located on the side of the current bar is itself connected to zero potential through a high resistance galvanometer or a relay, such as $G_m$, which plays the part of a voltmeter.

Each of the potential bars J is connected to zero potential through a conductor of high resistance such as, for example, 1,000 ohms.

Each of the potential bars $k$ is coupled to a potentiometer $P_m$, which will supply it with a potential $X_k$ which will be caused to increase progressively according to conditions which are indicated hereinafter.

At each intersection of two potential bars and two current bars, which corresponds to a pair of any center of production J and any center of consumption $k$, is connected a unit $C_m^n$ which comprises the following members (see FIG. 2):

Between the potential bars are interposed in series; a rectifier 1 which only permits current to pass from the bar $k$ to the bar J—an apparatus which reduces the potential of the bar $k$ from the value $X_k$ to the value $X_k-T_k^J$, for example either a dry cell battery or, as in the case of the diagram, the secondary 2 of a transformer connected in parallel with a high resistance 3, for example 600 ohms—and finally an apparatus $R_m^n$ such as a relay responsive to the passage of current from one potential bar to the other and adapted, in this case and in this case only, to connect together the current bars J and $k$ by closing the switch 4 of the connection 5.

Between the current bars are interposed in series the said connection device and a rectifier 6, which allows the current to pass only from the bar J to the bar $k$.

Arranged in this way, the calculating table is such that when none of the voltmeters $G_1$–$G_2$ . . . $G_m$, etc., has current passing through it, the following results are obtained:

In each unit in which the connection 5, between the current bar J and the current bar $k$, has effectively passing through it a current which effects the transfer of the current value $q_k^J$ from one of these bars to the other:

($a$) The total of current values transferred from any small bar J to the various bars $k$ can never be greater than $p^J$;

($b$) The total of the current values transferred from the various bars J to any one bar $k$ is equal to $c_k$;

($c$) Each of the current values $q_k^J$ passing through the unit of indices J and $k$ may thus be considered as measuring the quantity of articles dispatched from the corresponding center of production J to the corresponding center of consumption $k$.

In addition, with this arrangement, each instrument $G_1$–$G_2$ . . . $G_m$, indicates when current passes through it that the total received by the center $k$ which corresponds to it is less than $c_k$.

The manipulation of the calculating table is thus effected as follows:

The quantities $p^J$ and $c_k$ are marked in the table by the appropriate resistance boxes $E_1$–$E_2$ . . . $E_n$, and $F_1$–$F_2$ . . . $F_m$. The operator then acts (see FIG. 3) on the corresponding potentiometer $P_1$–$P_2$ . . . $P_m$, to increase progressively the potentials $X_k$ for all the indices 1–2 . . . $m$, such as the instruments G having the same indices, while these instruments still have current passing through them, and he continues this operation until all these instruments are at rest.

This function of the operator may be effected by devices of any kind which control the potentiometers in dependence on the instruments G, provided that they act progressively.

The result defined above being obtained, each of the potentials $X_k$ measures the same quantity as the displacement of the corresponding bar in the known mechanical system designed with the object of carrying out the same calculation, the quantities $q_k^J$ which must be dispatched from any one center J to any one center $k$ are deducted in identically the same way, which insures that the definition of these quantities complies with the desired condition, namely that the total of the products $q_k^J$ and $T_k^J$ is a minimum.

The calculating table thus indicates the relations which are to be effectively insured between the centers of production J and the centers of consumption $k$, these relations being indicated by the fact that the corresponding instruments $R_m^n$ have current passing through them, which can immediately be shown by indicators or lamps which are supplied from these instruments. By means of the ammeters $H_1$–$H_2$ . . . $H_n$, etc., the table also supplies the indication of the centers of production J, the available production of which is not fully employed.

In a more general way, the electric calculating table in accordance with the invention—embodied by the circuit diagram which has just been described or by any other device which applies the same principle but which makes use of other electrical magnitudes, or which can be measured electrically—makes it possible to deal, not only with the problem of reduction of transport costs to a minimum, but all problems in which unknowns which are of necessity positive or zero (in this case the quantities $q_k^J$) are forced to comply with linear equations, and to reduce to a minimum a function of these quantities $q_k^J$ which are also linear, in this case the sum of the products $q_k^J$ and $T_k^J$.

As has already been noted, the invention is concerned with the determination of a number $(m\times n)$ of unknown quantities, indicated by the symbols $x_q^p$, wherein the integer $p$ varies from 1 to $m$ and the integer $q$ varies from 1 to $n$, said unknown quantities being either positive or zero, in such a way as to satisfy simultaneously:

A system of $n$ linear equations:

$$C_q=x_q^1+x_q^2+\ldots+x_q^p+\ldots+x_p^m \qquad (Sq)$$

in which the $n$ terms $c_q$ are positive parameters.

A system of $m$ linear or equations or inequalities:

$$d^p\geqslant x_1^p+x_2^p+\ldots+x_q^p+\ldots x_n^p \qquad (S^p)$$

where the $n$ terms $d^p$ are positive parameters, and the condition to reduce to a minimum the double sum $$S_q^p=(a_1^1x_1^1+a_1^2x_1^2+\ldots+a_1^px_1^p+\ldots a_1^mx_1^m)+\ldots$$
$$\ldots+(a_q^1x_q^1+a_q^2x_q^2+\ldots+a_q^px_q^p+\ldots+a_q^mx_q^m)+\ldots$$
$$\ldots+(a_n^1x_n^1+a_n^2x_n^2+\ldots+a_n^px_n^p+\ldots+a_n^mx_n^m)$$

where the $(m\times n)$ coefficients $a_q^p$ of the unknown quantities $x_q^p$ are positive or zero parameters.

In FIGS. 4 and 5 is shown, an analog computer which gives an electrical solution of the problem outlined above, and which is characterized by the cooperation of the four arrangements next described below:

(1) In order to resolve the system of $n$ equations, a network of bars $I_1$–$I_q$–$I_n$ (FIG. 4) is supplied by D.C. voltage $U_2$ by connection to ground, each bar, for example $I_q$, being connected to the voltage source $U_2$ through a resistance $RI_q$, the ohmic value of which is chosen equal to $$RI_q=\frac{U_2}{c_q}$$

in such a way that, if the bar $I_q$ is at ground potential, the resistance $RI_q$ carries a current equal to $c_q$, and the current output of the bar $I_q$ is also equal to $c_q$.

(2) In order to solve the system of $m$ equations or inequalities, a network of $m$ bars (FIG. 4) $J^1$ . . $J^p$ . . . $J^m$ is supplied by a direct voltage $U_1$ by connection to ground, each bar, for example $J^p$, being connected to the voltage source $U_1$ through a resistance $RJ^p$, the ohmic value of which is chosen equal to $$RJ^p=\frac{U_1}{d^p}$$

Moreover, a unidirectional conduction element (detector, rectifier, vacuum tube, and the like) is connected between each bar $J^p$ and ground to increase the current passing through the resistance $RJ^p$. For example, if $U_1$ is positive (if the negative terminal of the source $U_1$ is connected to ground), the negative pole of the unidirectional conductor $D'_0{}^p$ is connected to ground, so that the potential of each bar $J^p$ can never be positive, and, if it is equal to zero, the current passing through the resistance $RJ^p$ will be equal to $d^p$, while the current output of the bar $J^p$ will be less or equal to $d^p$ (the difference being equal to the current passing through the unidirectionad conductor $D'_0{}^p$).

(3) Circuit breakers $r_q{}^p$ (FIG. 4) enable each bar $J^p$ to be connected to each bar $I_q$ by means of a unidirectional conductor $D'_q{}^p$ which allows the current to flow only in the direction from $J^p$ to $I_q$, while the potential $U_1$ and $U_2$ have opposite signs (for example, the negative terminal of the source $U_1$ and the positive terminal of the source $U_2$ are connected together to the bus bar T). When all bars $J^p$ and $I_q$ are connected to bar T and thus to ground T, it results from what has been outlined above under (1) and (2), that the current intensities $x_q{}^p$, passing from the bar $J^p$ to the bar $I_q$ answer $n$ equations in $S_q$ and $m$ inequalities in $S^p$.

(4) Finally those circuit breakers $r_q{}^p$ must be selected which are to be closed to fulfill the condition of the minimum value of the double sum $S_q{}^p$. The arrangement according to the present invention uses as interruptor $r_q{}^p$ the closing contact or a relay $R_q{}^p$, which is located in a control circuit as shown in FIG. 5. This control circuit or system comprises a set of $n$ conductors $V_1, V_2 \ldots V_q \ldots V_n$ and a set of $m$ conductors $W^1, W^2 \ldots W^p \ldots W^m$ Each of the conductors V, for example $V_q$, is kept at a positive voltage $y_q$ by means of a D.C. voltage source, the negative pole of which is applied to earth T, while each potential $y_q$ may be adjusted independently and continuously from zero upwards. The electric connection between each wire V and each wire W, for example between $V_q$ and $W^p$ comprises—in any order—an adjustable D.C. voltage source $a_q{}^p$, the positive pole of which is applied to the $V_q$ side and the negative pole to the $W^p$ side, a unidirectional member $D_q{}^p$ allowing the current to flow only in the direction from $V_q$ to $W^p$, and consisting, by way of example, of a crystal detector, a rectifier, a vacuum or gas-filled tube, or the like, and a relay $R_q{}^p$ which closes when the current flows; this relay is preferably a current relay, that is a relay of comparatively low operating voltage. Each conductor W, for example $W^p$, is connected to ground T through a resistance $RW^p$ of sufficiently high ohmic value to keep the ohmic resistance of the relay $R-{}^p$ and the internal resistances of the sources $y_q$ and $a_q{}^p$ low. It follows therefrom that, if the difference $(y_q-a_q{}^p)$ of the voltages $y_q$ and $a_q{}^p$ exceed the potential in said conductor $W^p$, the relay $R_q{}^p$ closes and the potential of the conductor $W^p$ returns to the value $(y_q-a_q{}^p)$, causing said relay $R_q{}^p$ to open, except in the case where $$y_q-a_q{}^p=y_{q'}-a_{q'}{}^p$$

in which case both relays $R_q{}^p$ and $R_{q'}{}^p$ remain closed.

The analog computer may be operated by hand, or be designed to be operated by means of an automatic control arrangement; the operation is the same in both cases. In order to solve a numerically determined problem, the computer is used in such a way that first the resistances $RI_q$ and $RJ^p$ and the sources $a_q{}^p$ are set to the numerical values corresponding to the data, and then all adjustable voltages $y_q$ are set at zero; all relays $R_q{}^p$ and therefore also all their contacts $r_q{}^p$ are open; the potential of each bar $I_q$ is $-U_2$, and the potential of each bar $J^p$ is equal to zero (the current $d^p$ flows through $RJ^p$ and $D'_0{}^p$). The operator increases progressively each of the potentials $y_q$ until the potential of the corresponding bar returns to zero; where automatic operation is intended, the corresponding arrangement (which is not described in the present invention) must be capable of realizing the same program, such arrangements being known to the art.

The increase of the first potential, for example of $y_1$, causes the relays $R_1{}^p$ to close successively in the order of the increasing values of the tension $a_1{}^p$; each closure of a contact $r_1{}^p$ increases the supply to the bar $I_1$ and its potential increases, when this potential of $I_1$ reaches zero, the operator leaves $y_1$ at the value obtained, referred to in the following as $b_1$. It will be noted, that because of the order in which the relays $R_1{}^p$ were closed, there obtains also, in view of the equality:

$$C_1=x_1{}^1+ \ldots +x_1{}^p+ \ldots +x_1{}^m$$

the minimum of the partial sum $$S_1{}^p=a_1{}^1x_1{}^1+ \ldots +a_1{}^px_1{}^p+ \ldots +a_1{}^mx_1{}^m$$

representing the first series of terms of the double sum $S_q{}^p$.

The operator then proceeds to increase another potential, again progressively, for example $y_2$ until the potential of the bar $I_2$ increases to zero. During this operation, two alternatives may occur.

In the first case, none of the closing relays corresponds to a conductor $W^p$, which corresponds in turn to a relay $R_1{}^p$ which had closed already during the increase of $y_1$ to the value $b_1$. The two increases of $y_1$ and $y_2$ do not react one upon the other, and we obtain the minimum of the second partial sum:

$$S_2{}^p=a_2{}^1x_2{}^1+ \ldots +a_2{}^px_2{}^p+ \ldots +a_2{}^mx_2{}^m$$

and thereby also that of the sum $(S_1{}^p+S_2{}^p)$.

In the second case, at least one of the relays $R_2{}^p$ which close, corresponds to a wire $W^p$, which corresponds itself to a relay $R_1{}^p$, already closed during the increase of $y_1$ up to the value $b_1$; if the value of $y_2$ at this moment is $b_2$, it results that $$b_2-a_2{}^p=b_1-a_1{}^p$$

According to the magnitude of $d^p$, two cases are possible, A and B:

(A) If $d^p$ is sufficiently large, the closure of $R_2{}^p$ leaves the potential of the bar $J^p$ at zero; in this instance there is also no interaction between the two increases $y_1$ and $y_2$, and we obtain the minimum of the sum $(S_1{}^p+S_2{}^p)$, since the minima of $S_1{}^p$ and of $S_2{}^p$ are known.

(B) If, on the other hand, $d^p$ is not large enough, that is if the closing of $R_2{}^p$ causes the current passing through the bar $J^p$ to rise beyond $d^p$, the potential of the bar $J^p$ will drop below zero, as well as that of bar $I_1$, which is no longer supplied by the bar $J^p$ through the contacts $r_1{}^p$; the operator will now return to the adjustment of $y_1$, in order to increase the same beyond $b_1$, causing relay $R_1{}^p$ to close and $R_2{}^p$ to open, and so on: The two relays $R_1{}^p$ and $R_2{}^p$ cannot be closed simultaneously (in the desired solution). The function of the analog computer therefore determines which relay should be left closed and which third relay should be closed instead of the second.

Assuming that $R_1{}^r$ are the relays not yet closed and corresponding to the wire $V_1$ $R_1{}^{r'}$ the first of these relays to close (assuming the $y_1$ rises sufficiently), then (1) $$a_1{}^{r'} \angle a_1{}^r$$

$R_2{}^s$ are the relays not yet closed and corresponding to the wire $V_2$ $R_2{}^{s'}$ the first of these relays to close (assuming that $y_2$ rises sufficiently), then (2) $$a_2{}^{s'} \angle a_2{}^s$$

and finally, in order to clarify the idea, assuming that (3) $$a_1{}^{r'}-a_1{}^p \angle a_2{}^{s'}-a_2{}^p$$

(the reasoning remaining the same for the opposite case).

As soon as the operator raises the voltage $y_1$ to the value of, for example, $a_1{}^{r'}$, and if $e$ is a positive, but small, quantity:

(4) $$y_1=a_1{}^{r'}+e$$

relay $R^{r'}$ will close, the bar $I_1$ returns to zero potential (if, as assumed in this case, the value $d^{r'}$ is sufficiently large), and the operator ceases to adjust $y_1$.

If, on the other hand, $d^{r'}$ is not large enough, the closure of $R_1{}^{r'}$ is sufficient to bring the potential of bar $I_1$ back to zero, it is necessary for this purpose to close another relay $R_1^r$; the argument applies to this relay.

However, in order to bring bar $I_2$ back to zero, the operator applies a little more voltage $y_2$, since relay $R_2^p$ will close when $(y_2 - a_2^p)$ is larger than $(y_1 - a_1^p)$, where $f$ is a positive but small quantity:

$$y_2 - a_2^p = y_1 - a_1^p + f$$

from which it follows, according to Equation 4:

$$y_2 - a_2^p + a_1^{r'} - a_1^p + e + f$$

The relay $R_2^p$ therefore applies to the bar $W^p$ the potential $$z^p = a_1^{r'} - a_1^p + e + f \quad (5)$$

where $z^p = y_2 - a_2^p$.

However, since the potential above relay $R_1^p$ is $$(y_1 - a_1^p)$$

it applies according to Equation 4:

$$a_1^{r'} - a_1^p + e$$

which is smaller than $x^p$ (Equation 5), and relay $R_1^p$ is open.

Thus $R_1^{r'}$ and $R_2^p$ have been closed, and $R_1^p$ opened; to this corresponds, in the partial sum $(S_1^p + S_2^p)$ the replacement of the two terms in $a_1^p$ and $a_2^p$ (corresponding to the impossible simultaneous closure of $R_1^p$ and $R_2^p$) by the two terms $$a_1^{r'} + a_2^p \quad (6)$$

This sum (6) is smaller than:

(a) Any other sum, corresponding to the closure of another relay $R_1^r$: $a_1^r + a_2^p$, owing to the inequality (1)
(b) The sum, corresponding, to the closure of the other relay $R_1^p$ and of relay $R_2^{s'}$: $a_2^{s'} + a_1^p$, owing to the inequality (3)
(c) Any other sum, corresponding to the closure of the other relay $R_1^p$ and one other relay $S_2^s$: $a_2^s + a_1^p$ since, in view of the inequality (2), such a sum is still larger than the preceding sum $(a_2^{s'} + a_1^p)$.

We have therefore, instead of the sum $(a_1^p + a_2^p)$ (which is impossible owing to the insufficiency of $d^p$), the smallest possible sum, namely:

$$a_1^{r'} + a_2^p \quad (6)$$

It results therefrom that in the sum $$s_1^p + s_2^p = (a_1^1 x_1^1 \ldots + a_1^p x_1^p + \ldots a_1^{r'} x_1^{r'} + \ldots) + (\ldots + a_2^p x_2^p \ldots + a_2^m x^m)$$

the sum $S_2^p$ is unchanged, thus remaining at minimum, while in the sum $S_1^p$, the expression $a_1^p x_1^p$ has been cancelled and replaced by the term $a_1^{r'} x_1^{r'}$; this substitution takes account of the equality $$s_1 = x_1^1 + \ldots + x_1^p + \ldots + x_1^{r'} + \ldots + x_1^m = c_1$$

and therefore, $x_1^{r'}$ has the same value as $x_1^p$ which it replaces. As already shown, $a_1^{r'}$ is the smallest of the quantities $a_1^r$ corresponding to the relays $R_1^r$ which are not yet closed (inequality (1)), the quantity $(a_1^{r'} x_1^{r'})$ is the smallest of the quantities $(a_1^r x_1^r)$ and the sum $S_1^p$ has the minimum value if $x_1^p$ is zero (this is no longer the absolute minimum of $S_1^p$); in other words, the method gives the minimum of the unit $(S_1^p + S_2^p)$, taking into consideration the equation of $c_1$ and $c_2$ and the inequality of $d^p$.

The same argument is applied successively to the increases of $y_3, y_4, \ldots y_q, \ldots y_n$, and results finally in the minimum of the double sum:

$$S_p^p = (a_1^1 x_1^1 + \ldots + a_1^p x_1^p + \ldots + a_1^m x_1^m) + \ldots + (a_q^1 x_q^1 + \ldots + a_q^p x_q^p + \ldots + a_q^m x_q^m) + \ldots + (a_n^1 x_n^1 + \ldots + a_n^p x_n^p + \ldots + a_n^m x_n^m)$$

Since the components of the analog computer have taken the potentials, or have been subjected to the intensities, or have assumed the positions, which correspond to the proposed solution, the following control instruments must be provided:

For the potential of each bar $I_q$ which should be zero, a voltmeter connected between each bar $I_q$ and ground T; For the current intensity passing through each bar $J^p$, an ammeter connected in series with the conductor $D'^p_0$ indicating the passing intensity, namely $r_0^p$, from which it follows that:

$$x_1^p + x_2^p + \ldots + x_q^p + \ldots + x_n^p = d^p - x_0^p$$

For the intensity $x_q^p$ passing through each contact $r_q^p$ and flowing from the bar $J^p$ to the bar $I_q$, an ammeter connected in series with the contact $r_q^p$ and indicating directly the said unknown $x_q^p$.

In practice, these last mentioned ammeters, which indicate $x_q^p$, are not always necessary; for example, where, according to problem under consideration, $x_q^p$ is an integral number, the simple statement of the positions of the contactors $R_q^p$ shows that $x_q^p$ is equal to zero for the open contacts, and this might be sufficient to give the solution of the problem.

In such above-mentioned distribution problems $q_k^J$ corresponding to $x_q^p$ in the general problem represents the number of articles produced by a production center J and consumed by a consumption center $k$; $C_k$ (corresponding to $c_q$) represents the needs of a consumption center $k$; $p^J$ (corresponding to $d^p$) represents the number of articles produced by a production center J, and $T_k^J$ (corresponding to $a_q^p$) represents the unit cost of transport of one article from center $p$ to center $q$.

The equations are soluble if $\Sigma p^J \geqslant \Sigma C_k$, i.e., if the total number of articles produced is equal to or greater than the total number needed. In the case when $\Sigma p^J > \Sigma C_k$ some articles will not be taken up and they will be those most expensive to transport, thereby enabling the transport costs to be reduced to a minimum.

I claim:

1. A computer comprising first and second potential bars corresponding respectively to production and consumption, first and second current bars corresponding respectively to production and consumption, the production potential and current bars constituting a pair, the consumption potential and current bars constituting a pair, a first connection connecting said potential bars and including in series a voltage source, a relay coil and a unidirectional conductor, a second connection connecting said current bars and including in series a unidirectiona. conductor and a relay switch operatively disposed with respect to and operated by said relay coil, means for applying a variable potential to the consumption potential bar, means for applying adjustable potentials to both said current bars, and means for indicating the potentials on said current bars.

2. A computer comprising a plurality of units each comprising: first and second potential bars corresponding respectively to production and consumption, first and second current bars corresponding respectively to production and consumption, the production potential and current bars constituting a pair, the consumption potential and current bars constituting a pair, a first connection connecting said potential bars and including in series a voltage source, a relay coil and a unidirectional conductor, a second connection connecting said current bars and including in series a unidirectional conductor and a relay switch operatively disposed with respect to and operated by said relay coil, means for applying a variable potential to the consumption potential bar, and means for applying adjustable potentials to both said current bars.

3. A computer comprising first and second potential elements corresponding respectively to first and second data categories, first and second current elements corresponding respectively to said first and second data categories, a first connection connecting said potential elements and including in series a voltage source, a relay coil and a unidirectional conductor, a second connection connecting said current elements and including in series a unidirectional conductor and a relay switch operatively disposed with respect to and operated by said relay coil, means for applying a variable potential to the second data category potential element, means for applying adjustable potentials to both said current elements, and means for indicating the potentials on said current elements.

4. A computer comprising first and second potential elements, first and second current elements, a first connection connecting said potential elements and including means for reducing potential differences between said potential elements, control means responsive to the resulting potential difference between said potential elements and a unidirectional conductor, a second connection connecting said current elements and including a unidirectional conductor and means operatively disposed with respect to and operated by said control means for selectively coupling said current elements through the associated unidirectional conductor, means for applying a variable potential to one of said potential elements, means for applying adjustable potentials to both said current elements, and means for indicating the potentials on said current elements.

References Cited in the file of this patent

UNITED STATES PATENTS

| | | |
|---|---|---|
| 2,023,589 | Hersey | Dec. 10, 1935 |
| 2,476,066 | Rochester | July 12, 1949 |

FOREIGN PATENTS

| | | |
|---|---|---|
| 687,419 | Germany | Jan. 29, 1940 |